(12) United States Patent
Kim et al.

(10) Patent No.: US 11,787,430 B2
(45) Date of Patent: Oct. 17, 2023

(54) APPARATUS AND METHOD FOR PROCESSING ACCELERATOR PEDAL MIS-OPERATION OF DRIVER

(71) Applicants: HYUNDAI MOTOR COMPANY, Seoul (KR); KIA MOTORS CORPORATION, Seoul (KR)

(72) Inventors: Hyeon Jun Kim, Siheung-si (KR); Young Chan Byun, Hwaseong-si (KR); Jin Geun Bae, Daegu (KR); Gi Bum Kim, Pohang-si (KR); Ki Bum La, Seoul (KR); Kyung Su Kim, Asan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 407 days.

(21) Appl. No.: 16/992,331

(22) Filed: Aug. 13, 2020

(65) Prior Publication Data

US 2021/0309240 A1 Oct. 7, 2021

(30) Foreign Application Priority Data

Apr. 3, 2020 (KR) ........................ 10-2020-0041119

(51) Int. Cl.
*B60W 50/08* (2020.01)
*B60W 50/14* (2020.01)
(Continued)

(52) U.S. Cl.
CPC ........ *B60W 50/087* (2013.01); *B60W 30/095* (2013.01); *B60W 50/14* (2013.01);
(Continued)

(58) Field of Classification Search
CPC .. B60W 10/06; B60W 10/184; B60W 30/095; B60W 30/18027; B60W 30/18036; B60W 40/08; B60W 50/087; B60W 50/10; B60W 50/12; B60W 50/14; B60W 2050/0088; B60W 2050/146;
(Continued)

(56) References Cited

U.S. PATENT DOCUMENTS 6,889,791 B2  5/2005  Watanabe
2004/0000444 A1  1/2004  Watanabe
(Continued)

FOREIGN PATENT DOCUMENTS

JP        H09301012 A  * 11/1997
KR  10-2002-0042858 A    6/2002

*Primary Examiner* — Peter D Nolan
*Assistant Examiner* — Ce Li Ll
(74) *Attorney, Agent, or Firm* — MORGAN, LEWIS & BOCKIUS LLP

(57) ABSTRACT

An apparatus for processing an accelerator pedal mis-operation of a driver: includes a vehicle information obtaining device that obtains vehicle information corresponding to an operation of the driver; and a processor that detects an accelerator pedal monitoring situation based on the vehicle information and determine the accelerator pedal mis-operation of the driver based on an opening degree of an (Continued)

accelerator pedal corresponding to the operation of the driver in the accelerator pedal monitoring situation to switch a vehicle mode to enter a safe mode.

17 Claims, 8 Drawing Sheets

(51) Int. Cl.
    *B60W 30/095* (2012.01)
    *G08G 1/14* (2006.01)
(52) U.S. Cl.
    CPC ..... *G08G 1/143* (2013.01); *B60W 2510/1005* (2013.01); *B60W 2510/20* (2013.01); *B60W 2540/10* (2013.01); *B60W 2540/12* (2013.01); *B60W 2540/20* (2013.01)
(58) Field of Classification Search
    CPC ..... B60W 2510/1005; B60W 2520/10; B60W 2520/14; B60W 2540/12; B60W 2540/18; B60W 2540/20; B60W 2552/30; B60W 2556/50; B60W 2710/065; G08G 1/143; G08G 1/166; G08G 1/168
    See application file for complete search history.

(56) References Cited

U.S. PATENT DOCUMENTS

| | | | |
|---|---|---|---|
| 2005/0075777 A1* | 4/2005 | Kim | B60W 30/18027 340/425.5 |
| 2006/0287800 A1* | 12/2006 | Watanabe | B62D 15/0275 701/96 |
| 2007/0142169 A1* | 6/2007 | Marcil | B60K 28/06 477/107 |
| 2012/0209488 A1* | 8/2012 | Nagaya | B60W 10/06 701/70 |
| 2012/0221209 A1* | 8/2012 | Tatsukawa | B60W 10/184 701/42 |
| 2014/0025267 A1* | 1/2014 | Tezuka | B60W 30/18027 701/51 |
| 2016/0096526 A1* | 4/2016 | D'Amato | B60W 50/087 701/93 |
| 2016/0298762 A1* | 10/2016 | Bang | F16H 61/0059 |
| 2019/0072180 A1* | 3/2019 | Kim | F16H 63/483 |
| 2020/0331474 A1* | 10/2020 | Oda | B60W 50/00 |
| 2021/0039665 A1* | 2/2021 | Kaminade | B60W 50/10 |
| 2021/0244326 A1* | 8/2021 | Nishimura | G06V 20/58 |

* cited by examiner

ововATUS AND METHOD FOR
PROCESSING ACCELERATOR PEDAL
MIS-OPERATION OF DRIVER

CROSS-REFERENCE TO RELATED
APPLICATION

This application claims the benefit of priority to Korean Patent Application No. 10-2020-0041119, filed in the Korean Intellectual Property Office on Apr. 3, 2020, the entire contents of which are incorporated herein by reference.

TECHNICAL FIELD

The present disclosure relates to an apparatus and a method for processing an accelerator pedal mis-operation of a driver.

BACKGROUND

The increase in the older driver population has let do concerns with regard to the reaction speed, cognitive ability, and judgment ability to the surrounding environment. Further, accidents caused by mis-operating a vehicle have been continued to increase. In addition to the deterioration in physical ability due to the age of a driver, a vehicle mis-operation is caused by various factors such as simple mis-understanding, bipedal driving, increased driver fatigue, inadequate operation after applying shift-by-wire (SBW), and the like.

The information included in this Background section is only for enhancement of understanding of the general background of the present disclosure and may not be taken as an acknowledgement or any form of suggestion that this information forms the prior art already known to a person skilled in the art.

SUMMARY

An aspect of the present disclosure provides an apparatus and a method for processing an accelerator pedal mis-operation of a driver, which can analyze an operation pattern of the driver to detect the accelerator pedal mis-operation of the driver and take action on the detected accelerator pedal mis-operation of the driver.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for processing an accelerator pedal mis-operation of a driver includes: a vehicle information obtaining device that obtains vehicle information corresponding to an operation of the driver; and a processor that detects an accelerator pedal monitoring situation based on the vehicle information and determine the accelerator pedal mis-operation of the driver based on an opening degree of an accelerator pedal corresponding to the operation of the driver in the accelerator pedal monitoring situation to switch a vehicle mode to enter a safe mode.

The vehicle information obtaining device may obtain at least one of a vehicle speed, a brake pedal position, a steering wheel operation angle, gear information, a direction indicator state, obstacle detection, an accelerator pedal opening, or a vehicle state through sensors installed in a vehicle.

The processor may detect a parking situation or a departure situation as the accelerator pedal monitoring situation.

The processor may determine the accelerator pedal mis-operation of the driver when the accelerator pedal opening is out of a preset range in the accelerator pedal monitoring situation.

The processor may stop a motor or shift gear information to an N stage when switching to the safe mode when a vehicle is an eco-friendly vehicle.

The processor may ignore an accelerator pedal input corresponding to the operation of the driver when switching to the safe mode when a vehicle is an engine vehicle.

The processor may output a safe mode entry notification and an accelerator pedal mis-operation warning through at least one of a cluster and a speaker when switching to the safe mode.

The processor may release the safe mode and allow acceleration control of a vehicle by an accelerator pedal operation of the driver when an accelerator pedal re-operation of the driver is detected in the safe mode.

The processor may determine an accelerator pedal mis-operation detection error when the safe mode is released within a preset time after entering the safe mode.

The processor may set sensitivity of accelerator pedal mis-operation detection by changing at least one reference value of the steering wheel operation angle, the accelerator pedal opening, and monitoring time when the accelerator pedal mis-operation detection error is determined.

The processor may analyze a driving pattern of the driver and set the sensitivity of the accelerator pedal mis-operation detection based on the analyzed driving pattern.

According to another aspect of the present disclosure, a method of processing an accelerator pedal mis-operation of a driver includes: obtaining vehicle information corresponding to an operation of the driver; detecting an accelerator pedal monitoring situation based on the vehicle information; determining an accelerator pedal mis-operation of the driver based on an opening degree of an accelerator pedal corresponding to the operation of the driver in the accelerator pedal monitoring situation; and switching a vehicle mode to enter a safe mode when the accelerator pedal mis-operation is determined.

The vehicle information may include at least one of a vehicle speed, a brake pedal position, a steering wheel operation angle, gear information, a direction indicator state, obstacle detection, an accelerator pedal opening, or a vehicle state through sensors installed in a vehicle.

The detecting an accelerator pedal monitoring situation may include detecting a parking situation or a departure situation as the accelerator pedal monitoring situation.

The determining an accelerator pedal mis-operation of the driver may include determining the accelerator pedal mis-operation of the driver when the accelerator pedal opening is out of a preset range in the accelerator pedal monitoring situation.

The switching a vehicle mode to the safe mode may include stopping a motor or shifting gear information to an N stage when switching to the safe mode when a vehicle is an eco-friendly vehicle.

The switching a vehicle mode to the safe mode may include ignoring an accelerator pedal input corresponding to the operation of the driver when switching to the safe mode when a vehicle is an engine vehicle.

The switching a vehicle mode to the safe mode may include outputting a safe mode entry notification and an accelerator pedal mis-operation warning through at least one of a cluster and a speaker when switching to the safe mode.

The method may further include releasing the safe mode to allow acceleration control of the vehicle by an accelerator pedal operation of the driver when an accelerator pedal re-operation of the driver is detected in the safe mode.

The method may further include determining an accelerator pedal mis-operation detection error when the safe mode is released within a preset time after entering the safe mode.

The method may further include setting sensitivity of accelerator pedal mis-operation detection by changing at least one reference value of the steering wheel operation angle, the accelerator pedal opening, or monitoring time when the accelerator pedal mis-operation detection error is determined.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
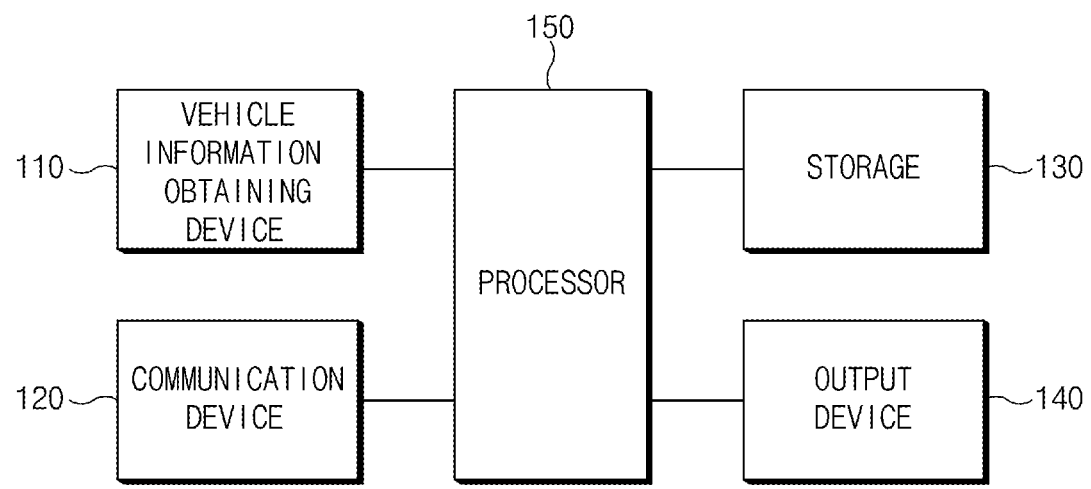
FIG. 1 is a block diagram illustrating an apparatus for processing an accelerator pedal mis-operation of a driver according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for processing an accelerator pedal mis-operation of a driver according to an embodiment of the present disclosure.

Referring to FIG. 1, an apparatus for processing an accelerator pedal mis-operation of a driver includes a vehicle information obtaining device 110, a communication device 120, storage 130, an output device 140, and a processor 150.

The vehicle information obtaining device 110 obtains vehicle information corresponding to an operation (maneuver) of a driver by using various sensors and/or electronic control units (ECUs) installed in a vehicle. In this case, the vehicle information may include a vehicle speed, a brake pedal position, a steering wheel operation angle, gear information, obstacle detection, an accelerator pedal opening, a direction indicator state, and/or a vehicle state. The vehicle information obtaining device 110 obtains the current speed of a vehicle through a speed sensor, and detects the degree of stepping on a brake pedal through a brake pedal position sensor. The vehicle information obtaining device 110 may measure a steering wheel operation angle corresponding to a steering wheel operation of a driver, that is, a rotation angle (steering angle) of a steering wheel through a steering angle sensor installed in a steering column switch cluster. The vehicle information obtaining device 110 may obtain a position of a selector lever corresponding to an operation of a driver, that is, gear information, such as P stage, D stage, R stage, or N stage, through a selector lever position sensor, and obtain information about an obstacle located within a specified distance (e.g., 60 cm) from the vehicle through a proximity sensor. The vehicle information obtaining device 110 may detect whether the left and/or right direction indicator(s) are/is turned on through a direction indicator lever position sensor, and a vehicle state, that is, a state in which the vehicle is turned on (start-on) or turned off (start-off) through a drive control device (e.g., an engine control device or a motor control device). The vehicle information obtaining device 110 may obtain the opening degree of an accelerator pedal by using accelerator pedal position sensor, which measures an opening angle of a throttle valve corresponding to the accelerator pedal operation of the driver, that is, a stepped degree of the accelerator pedal. In addition, the vehicle information obtaining device 110 may obtain vehicle information (e.g., door opening/ closing information or door locking/unlocking information, and the like) through electronic stability control (ESC), traction control system (TCS), and/or antilock brake system (ABS), and the like.

The communication device 120 communicates with various sensors and/or electronic control devices connected through a vehicle network. The vehicle network is implemented with a controller area network (CAN), a media oriented systems transport (MOST) network, a local interconnect network (LIN), an Ethernet and/or an X-by-wire (Flexray). The communication device 120 enters a sleep mode when a specified time elapses after the vehicle enters a warning mode. In this case, the warning mode refers to a state in which the occurrence of a window breakage and/or a forced door opening is detected to prevent vehicle theft after a specified time has elapsed since the door is locked after the vehicle is turned off. The communication device 120 stores a trigger signal in the storage 130, which is generated when entering the sleep mode. For example, the communication device 120 switches the operation mode of the B-CAN to the sleep mode after 3 minutes or more after the vehicle mode transitions to the warning mode, and stores the trigger signal in the storage 130. The communication device 120 may transmit the trigger signal indicating that the operation mode of the communication device 120 is switched to the sleep mode, to the vehicle information obtaining device 110.

The storage 130 may store the vehicle information obtained by the vehicle information obtaining device 110, and may store various setting information that is set in advance. The storage 130 may store setting information changed by a user. The storage 130 may store a sensitivity setting reference table as illustrated in following Table 1. The sensitivity setting reference table is used when a user (e.g., a driver) manually changes the accelerator pedal mis-operation detection sensitivity setting.

TABLE 1

| Setting of sensitivity | Sensitive | Normal | Insensitive |
|---|---|---|---|
| Steering wheel operation angle (forward parking condition, deg) | 280/70/160 | 300/90/180 | 330/100/190 |
| Steering wheel operation angle (reverse parking condition, deg) | 280 | 300 | 340 |
| Accelerator pedal opening detection condition (%) | 60 | 70 | 80 |
| Monitoring time | 10 seconds | 5 seconds | 3 seconds |

The storage 130 may store a program for operating the processor 150, and may temporarily store input data and/or output data of the processor 150. The storage 130 may be implemented with at least one of a flash memory, a hard disk, a secure digital (SD) card, a random access memory (RAM), a static random access memory (SRAM), and a read only memory (ROM), a programmable read only memory (PROM), an electrically erasable and programmable ROM (EEPROM), an erasable and programmable ROM (EPROM), or a storage medium (recording medium) such as a register, a removable disk, a web storage, and the like. The output device 140 may output information indicating that the vehicle mode is switched to the safe mode and/or information warning of the accelerator pedal mis-operation. The output device 140, which is provided for outputting information such as visual information, auditory information, tactile information, and the like, may include a display, an audio output module, a tactile signal output module, and the like. The display may include at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, or a cluster. The audio output module may output audio data stored in the storage 130. The sound output module may include a receiver, a speaker, a buzzer, and the like. The tactile signal output module outputs a signal of a type that the user may perceive as tactile. For example, the tactile signal output module may be implemented with a vibrator to control vibration intensity and patterns.

The processor 150 controls the overall operation of an apparatus for processing an accelerator pedal mis-operation. The processor 150 may be implemented with at least one of an application specific integrated circuit (ASIC), a digital signal processor (DSP), a programmable logic device (PLD), a field programmable gate arrays (FPGA), a central processor (CPU), a microcontroller, or a microprocessor.

The processor 150 analyzes the operation pattern (behavioral pattern) of a driver during driving of a vehicle to select an accelerator pedal monitoring situation determination condition. The accelerator pedal monitoring situation determination condition is a condition for determining a situation in which an accelerator pedal mis-operation may occur, that is, a situation in which the accelerator pedal monitoring is required. In this case, the accelerator pedal monitoring situation may be a parking situation, a leaving situation, or a slow traveling situation. The processor 150 collects the vehicle information corresponding to the operation of a driver while the vehicle is driven and determines the accelerator pedal monitoring situation determination condition from the collected vehicle information through big data analysis. The processor 150 may reselect the accelerator pedal monitoring situation determination condition at a preset period of time. For example, when a driver normally parks, the processor 150 may determine (detect) a parking situation by analyzing the steering and accelerator pedal operation pattern of the driver.

The processor 150 determines whether the vehicle situation derived based on the vehicle information obtained by the vehicle information obtaining device 110 is an accelerator pedal monitoring situation. In other words, the processor 150 determines whether the vehicle situation meets the accelerator pedal monitoring situation determination condition by using the obtained vehicle information. The processor 150 detects the vehicle situation as the accelerator pedal monitoring situation when the vehicle situation determined based on the obtained vehicle information meets at least one of the following four parking situation determination conditions.

[Parking Situation Determination Condition]

Condition 1) A first forward parking situation in case that the steering wheel is operated at 300 deg or higher after the vehicle speed is decelerated to 4 KPH or less through a brake operation at 10 KPH or higher in a situation where there is no turn signal.

Condition 2) Case that the steering wheel is operated at 180 deg or more in 1.5 seconds after the steering wheel is operated 90 deg or more in one direction in a situation where the vehicle speed is 10 KPH or less.

Condition 3) Case that the selector lever is positioned at the D-stage, the vehicle speed is 2 KPH or less, the selector lever is shifted to the reverse stage (R stage), the steering wheel operation angle is 300 deg or more, and the brake is not operated (break off).

Condition 4) Case that the gear information of the obstacle detection direction is selected in a state where an obstacle is detected at a radius of 60 cm or less from the vehicle by the proximity sensor (e.g., case that the selector lever is positioned at the D-stage in a state where an obstacle is detected by a left front sensor, or the selector lever is positioned at the R-stage in a state where an obstacle is detected by a rear sensor).

When the vehicle situation based on the vehicle information meets condition 1, the processor 150 determines (detects) the corresponding situation as the first forward parking condition. When the vehicle situation meets condition 2, the processor 150 determines the corresponding situation as the second forward parking condition. When the vehicle situation meets condition 3, the processor 150 detects the corresponding situation as a reverse parking situation. When the vehicle situation meets condition 4, the processor 150 determines the vehicle situation as a parking condition. That is, the processor 150 detects the vehicle situation as the accelerator pedal monitoring situation when at least one of the four parking situation determination conditions is met.

When the vehicle situation derived based on the vehicle information obtained by the vehicle information obtaining device 110 meets the following two departure situation determination conditions, the processor 150 determines the vehicle situation as the accelerator pedal monitoring situation.

[Departure Situation Determination Condition]

Condition 1) The selector lever position is set to the P stage and the vehicle is turned off after the vehicle stops.

Condition 2) A trigger signal is stored when B-CAN sleeps since 3 minutes or more has elapsed after the vehicle enters the warning mode.

When the vehicle condition satisfies the parking condition determination condition or the exit condition determination condition, the processor 150 determines that the accelerator pedal monitoring is necessary. The processor 150 generates a trigger signal corresponding to an accelerator pedal monitoring situation. The processor 150 may display a guide message such as "execute accelerator pedal monitoring" on the cluster when a trigger signal informing the detection of the accelerator pedal monitoring situation is generated. When the vehicle is in a situation where the monitoring of the accelerator pedal is required, the processor 150 determines whether the opening degree of the accelerator pedal corresponding to the operation of the driver is out of a preset reference range (preset range). When the opening degree of the accelerator pedal is out of a preset range (e.g., 70%), the processor 150 determines the opening degree of the accelerator pedal as abnormal acceleration and enters the safe mode. In this case, in the safe mode, the abnormal acceleration due to the accelerator pedal mis-operation of the driver is ignored. When the vehicle is an eco-friendly vehicle such as a hybrid vehicle, an electric vehicle, and the like, when entering the safe mode, the processor 150 controls the motor torque to be "0 (zero)" or shifts the selector lever position to the N-stage. When the vehicle is an engine vehicle, the processor 150 ignores the input (accelerator pedal input) by the accelerator pedal operation of the driver when entering the safe mode.

When the vehicle mode is changed to the safe mode, the processor 150 displays a message of "Entry into safe mode" on the cluster informing the vehicle mode change. In addition, the processor 150 may output a warning such as "Please check the pedal mis-operation". The processor 150 may output a warning in the form of a text message and/or a voice message when the warning is output.

The processor 150 releases the safe mode of the vehicle when an accelerator pedal reoperation of the driver is detected in the safe mode. When the driver desires to accelerate, because the behavior pattern of repeatedly operating the accelerator pedal is shown, the processor 150 releases the safe mode when the driver completely releases the foot from the accelerator pedal and then presses the accelerator pedal again. When entering the safe mode in a parking situation, the processor 150 releases the safe mode when the accelerator pedal is re-operated within a preset range, the brake is operated, and the selector lever is positioned at the P-stage. When entering the safe mode in the departure situation, the processor 150 releases the safe mode when the accelerator pedal is re-operated within a preset range and the brake is operating. When the safe mode is released, the processor 150 may output a notification to the output device 140 so that the driver can identify the release of the safe mode. After the safe mode is released, the processor 150 allows vehicle acceleration by the accelerator pedal operation of the driver. For example, when the accelerator pedal is operated again after the brake pedal is operated, the processor 150 releases the safe mode and allows vehicle acceleration.

In addition, when the safe mode is released within a preset time (e.g., 3 seconds) after entering the safe mode, the processor 150 determines the releasing of the safe mode as an accelerator pedal mis-operation detection error, that is, a false detection. The processor 150 may output a pop-up message of "Please adjust the sensitivity by setting the sensitivity to match the driving pattern" to the output device 140 when the accelerator pedal mis-operation detection is determined as an error. The driver may set the sensitivity to sensitive, normal or insensitive in a sensitivity setting menu. The processor 150 may change the set sensitivity corresponding to the driver input based on the sensitivity setting reference table shown in Table 1.

Figure 2:
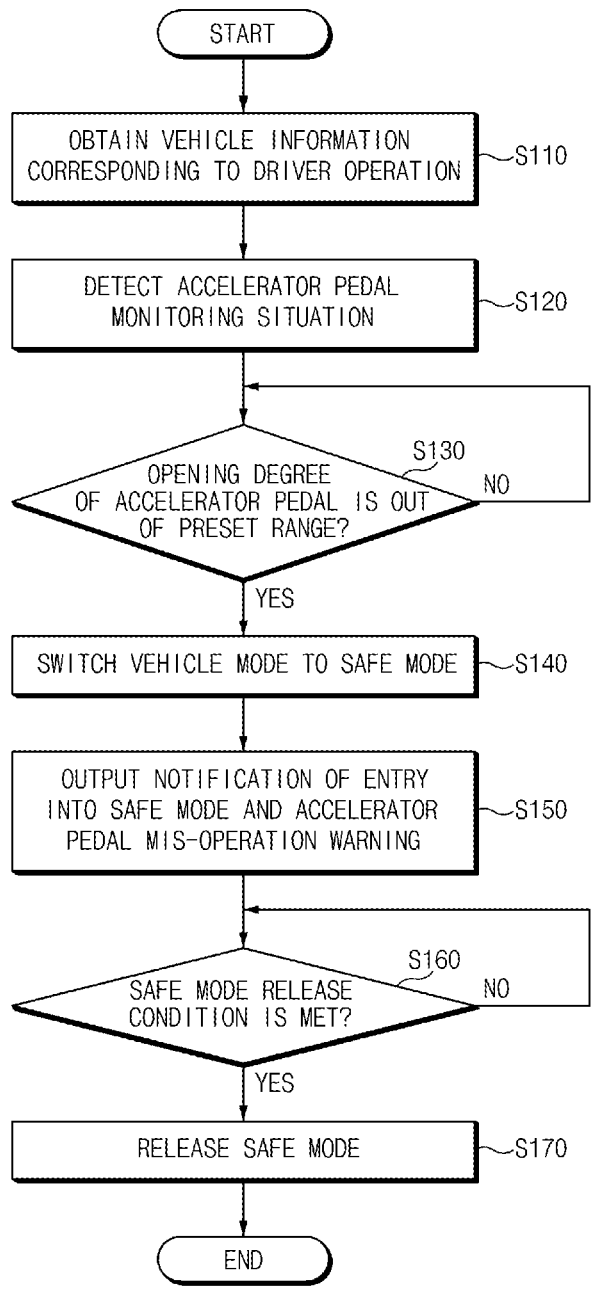
FIG. 2 is a flowchart illustrating a method of processing an accelerator pedal mis-operation according to an embodiment of the present disclosure.

FIG. 2 is a flowchart illustrating a method of processing an accelerator pedal mis-operation according to an embodiment of the present disclosure.

In S110, the processor 150 obtains vehicle information corresponding to the operation of the driver by using the vehicle information obtaining device 110. The vehicle information may include a vehicle speed, a brake pedal position, a steering wheel operation angle, gear information, obstacle detection, an accelerator pedal opening degree, a direction indicator state, a vehicle state, and the like.

In S120, the processor 150 detects the accelerator pedal monitoring situation based on the obtained vehicle information. When the accelerator pedal monitoring situation is detected, the processor 150 performs accelerator pedal monitoring.

In S130, the processor 150 determines whether the opening degree of the accelerator pedal corresponding to the operation of the driver is out of a preset range in the accelerator pedal monitoring situation. In this case, the preset range is determined corresponding to the sensitivity setting. The processor 150 determines whether the accelerator pedal is mis-operated based on whether the opening degree of the accelerator pedal is out of the preset range. In other words, when the opening degree of the accelerator pedal is out of the preset range, the processor 150 determines that the accelerator pedal is mis-operated. The processor 150 determines that the accelerator pedal is normally operated when the opening degree of the accelerator pedal is within the preset range.

In S140, when the opening degree of the accelerator pedal is out of the preset range, the processor 150 switches the vehicle mode to the safe mode. In other words, when the accelerator pedal mis-operation is detected, the processor 150 switches the vehicle mode to the safe mode and ignores the input corresponding to the accelerator pedal operation.

In S150, the processor 150 outputs a notification informing the safe mode entry and a warning informing the accelerator pedal mis-operation. The processor 150 may output a message to the cluster such that the driver may recognize that the vehicle mode is switched to the safe mode. In addition, the processor 150 may output a warning message informing the accelerator pedal mis-operation confirmation to the cluster in the form of text, and at the same time, through the speaker in the form of a voice signal.

In S160, the processor 150 determines whether the vehicle satisfies the safe mode release condition by using the vehicle information. After entering the safe mode, the processor 150 determines whether an accelerator pedal reoperation of the driver occurs.

In S170, the processor 150 releases the safe mode when the vehicle satisfies the safe mode release condition. After entering the safe mode, the processor 150 releases the safe mode when the accelerator pedal reoperation of the driver is detected. The processor 150 may output a message informing that the safe mode is released.

When the safe mode is released by the accelerator pedal re-operation of the driver within a preset time (e.g., 3 seconds) after entering the safe mode, the processor 150 determines the accelerator pedal re-operation as an accelerator pedal mis-operation detection error (false detection). Accordingly, the processor 150 may output a message requesting confirmation of sensitivity setting to the output device 140. The processor 150 may set the sensitivity of the accelerator pedal mis-operation detection by changing at least one reference value of the steering wheel operation angle, the accelerator pedal opening degree, and the monitoring time based on the driver input. Although it has been described in the embodiment that the sensitivity of the accelerator pedal mis-operation detection is set based on the driver input, the embodiment is not limited thereto, and it is possible to implement the embodiment in which the driving pattern is identified and the sensitivity of the accelerator pedal mis-operation detection is set corresponding to the identified driving pattern. For example, the processor 150 obtains the driver input (operation) and vehicle behavior information corresponding to the driver input through various sensors and/or electronic control units (ECUs) installed in the vehicle, and analyzes the obtained information to determine the driving pattern of the driver. The processor 150 sets the sensitivity of the accelerator pedal mis-operation detection corresponding to the determined driving pattern.

Figure 3A:
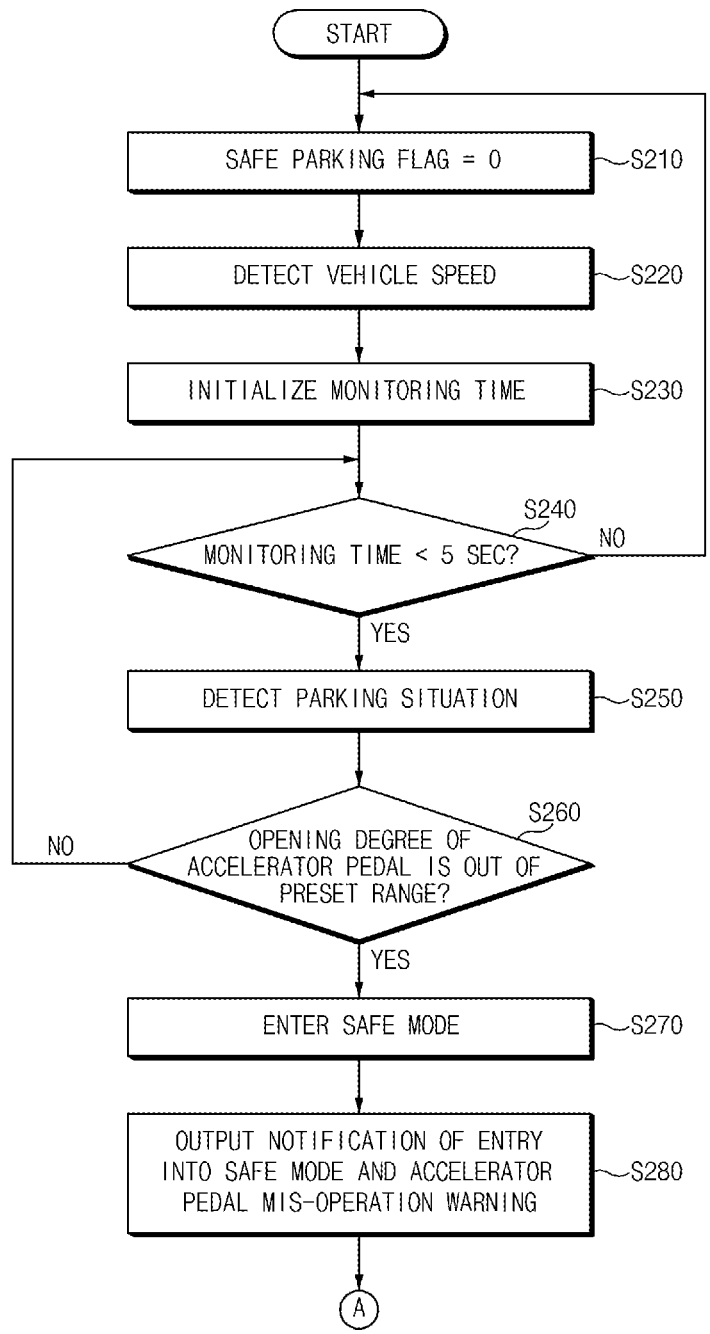
FIGS. 3A and 3B are flowcharts illustrating a method of processing an accelerator pedal mis-operation in a parking situation according to an embodiment of the present disclosure.
Figure 3B:
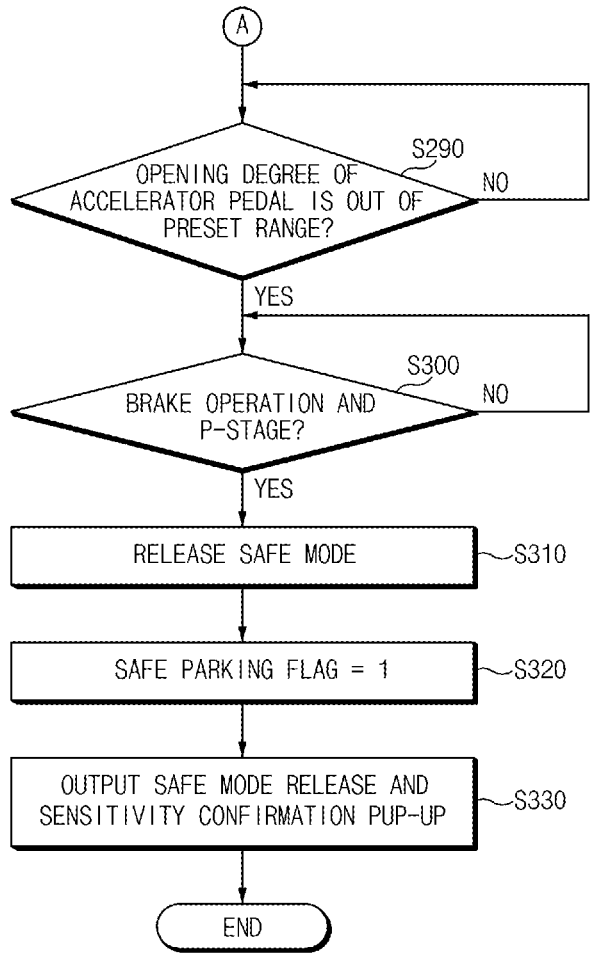

FIGS. 3A and 3B are flowcharts illustrating a method of processing an accelerator pedal mis-operation in a parking situation according to an embodiment of the present disclosure.

When the function of processing the accelerator pedal mis-operation is activated, in S210, the processor 150 initializes a safe parking flag. The processor 150 sets the safe parking flag to "0".

In S220, the processor 150 detects the vehicle deceleration when the vehicle speed decelerates below a specified reference speed (e.g., 10 KPH). The processor 150 detects the vehicle deceleration corresponding to the brake pedal operation of the driver.

When the vehicle deceleration is detected, in S230, the processor 150 initializes the monitoring time. In other words, the processor 150 resets a timer to "0" and measures the monitoring time by using the timer.

The processor 150 checks whether the monitoring time is less than a preset time, for example, 5 seconds (S240). When the monitoring time is less than 5 seconds, in S250, the processor 150 detects a parking situation based on the vehicle information obtained by the vehicle information obtaining device 110. The processor 150 determines that the vehicle is parked based on the steering wheel operation pattern and brake pedal operation pattern of the driver.

In S260, the processor 150 determines whether the opening degree of the accelerator pedal is out of a preset range in a parking situation. When the opening degree of the accelerator pedal corresponding to the operation of the driver is out of the preset range, the processor 150 determines the operation of the driver as the accelerator pedal mis-operation.

In S270, the processor 150 enters the safe mode when the opening degree of the accelerator pedal is out of a preset range. When the accelerator pedal mis-operation of the driver is detected, the processor 150 switches the vehicle mode to the safe mode. The processor 150 enters the safe mode and ignores the opening degree of the accelerator pedal corresponding to the operation of the driver to limit the acceleration of the vehicle.

In S280, the processor 150 outputs warning of the safe mode entry and the accelerator pedal mis-operation. When entering the safe mode, the processor 150 may display, on the cluster, a message informing the safe mode entry and the accelerator pedal mis-operation.

In S290, the processor 150 determines whether the opening degree of the accelerator pedal corresponding to the operation of the driver in the safe mode is within the preset range. After entering the safe mode, the processor 150 determines whether the driver re-operates the accelerator pedal.

When the opening degree of the accelerator pedal opening is within the preset range, in S300, the processor 150 determines whether the brake is activated and whether the selector lever is positioned at the P-stage. The processor 150 determines that the safe mode release condition is met when the brake pedal is depressed and the selector lever is positioned at the P stage in the state where the accelerator pedal re-operation of the driver is detected. In the state where the accelerator pedal re-operation of the driver is detected, when the brake pedal is not depressed or the selector lever is not positioned at the P stage, or the brake pedal is not depressed and the selector lever is not positioned at the P stage, it is determined that the safe mode releasing condition is not met.

In S300, the processor 150 releases the safe mode when the brake is in operation and the selector lever is positioned at the P stage.

When the safe mode is released, the processor 150 sets the safe parking flag to "1" in S320. That is, the processor 150 determines that parking is safely completed and sets the safety parking flag to "1".

In S330, the processor 150 outputs a safe mode release and sensitivity confirmation pop-up. The processor 150 may output a notification informing that the safe mode is released and the current sensitivity setting information in the form of a pop-up to the display. The driver may identify the safe mode release and the current sensitivity setting information through a pop-up displayed on the display.

Figure 4A:
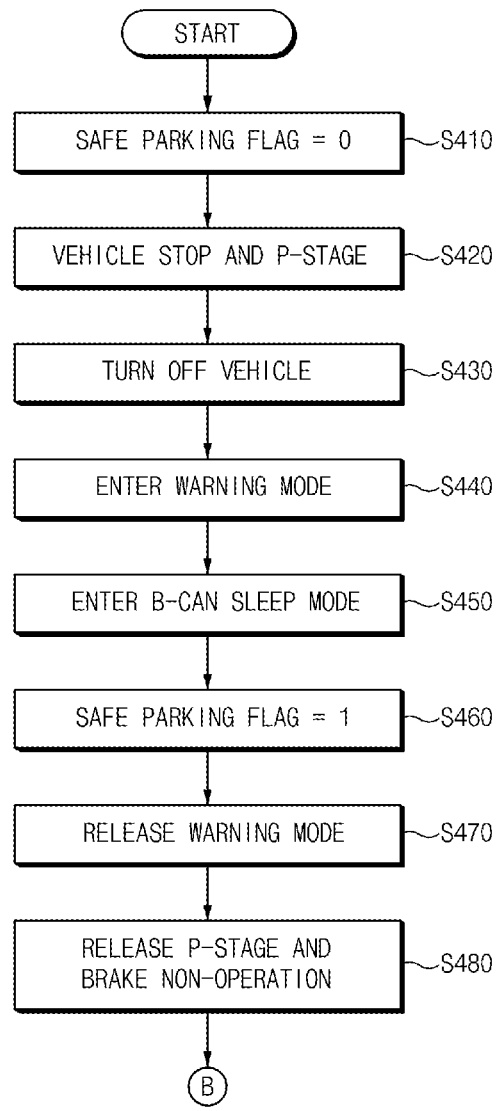
FIGS. 4A, 4B, and 4C are flowcharts illustrating a method of processing an accelerator pedal mis-operation in a departure situation according to an embodiment of the present disclosure.
Figure 4B:
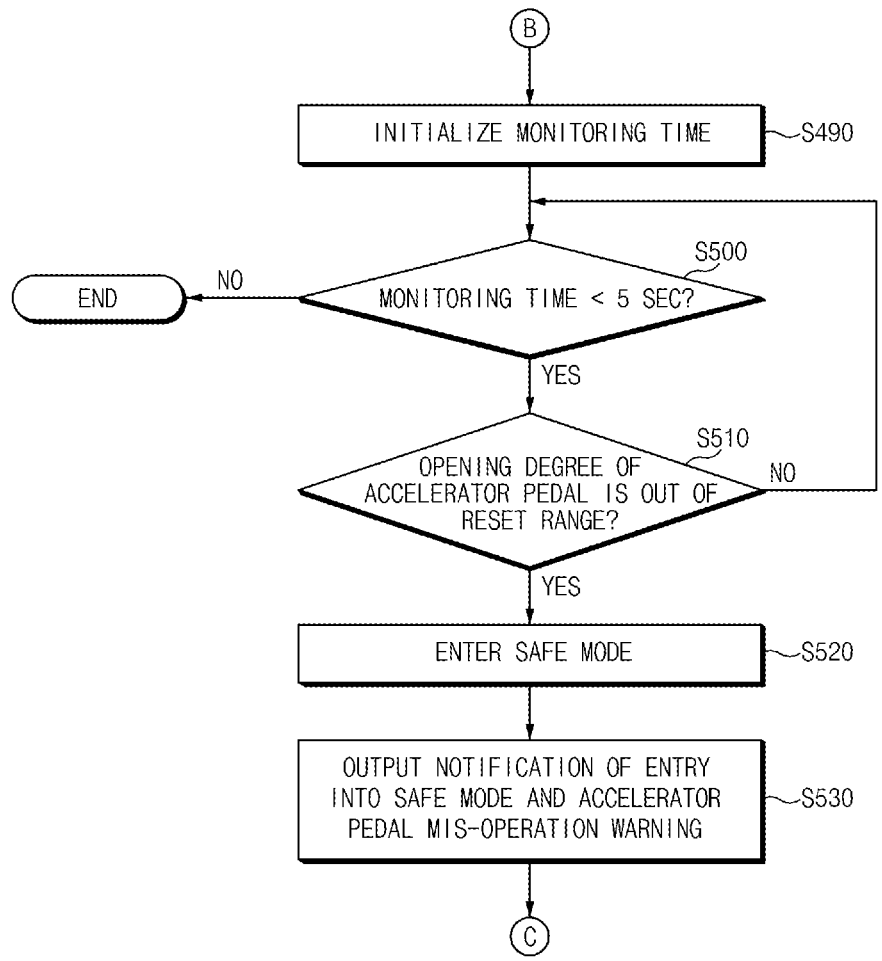
Figure 4C:
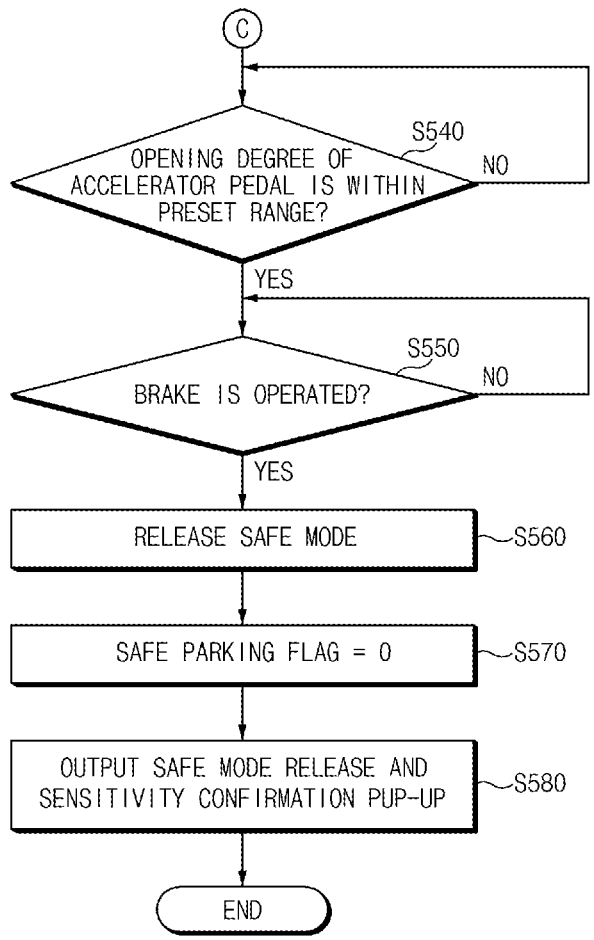

FIGS. 4A to 4C are flowcharts illustrating a method of processing an accelerator pedal mis-operation in a departure situation according to an embodiment of the present disclosure.

When the function of processing the accelerator pedal mis-operation is activated, in S410, the processor 150 initializes a safe parking flag. The processor 150 sets the safe parking flag to "0".

In S420, the processor 150 identifies the vehicle stop and the P-stage of the selector lever.

In operation S430, the processor 150 identifies the turning off of the vehicle.

In S440, the processor 150 enters a warning mode when a specified time has elapsed in a state in which the vehicle is turned off. The warning mode means the monitoring state for preventing vehicle theft.

In S450, the processor 150 identifies entry into the sleep mode of the B-CAN after a preset time after entering the warning mode.

When the B-CAN enters the sleep mode, the processor 150 sets the safe parking flag to "1" in S460. After the vehicle stops, the selector lever is positioned at the P-stage and the vehicle is turned off. After entering the warning mode, when the B-CAN enters the sleep mode, the processor 150 determines that the parking of the vehicle is completed and sets the safety parking flag.

Thereafter, the processor 150 releases the warning mode in S470, and identifies the release of the P-stage of the selector lever and the non-operation of the brake in S480. When the door lock is normally released by the driver and the selector lever is changed from the P-stage to the D-stage or R-stage and the driver's foot is released from the brake pedal, the processor 150 determines that the vehicle is in a departure starting situation.

In S490, the processor 150 initializes the monitoring time when the departure starts. The processor 150 operates the timer after resetting the timer.

In S500, the processor 150 determines whether the monitoring time is less than 5 seconds.

In S510, the processor 150 determines whether the opening degree of the accelerator pedal is out of the preset range in a state in which the monitoring time is less than 5 seconds. The processor 150 determines whether an accelerator pedal mis-operation of the driver occurs.

In S520, the processor 150 enters the safe mode when the opening degree of the accelerator pedal is out of the preset range. For example, when the opening degree of the accelerator pedal corresponding to the operation of the driver is 70% or more, the processor 150 determines that the accelerator pedal mis-operation of the driver occurs and switches the vehicle mode to the safe mode.

In S530, the processor 150 outputs warning of the safe mode entry and the accelerator pedal mis-operation.

In S540, the processor 150 determines whether the opening degree of the accelerator pedal corresponding to the operation of the driver in the safe mode is within the preset range. After entering the safe mode, the processor 150 determines whether the driver re-operates the accelerator pedal.

When the opening degree of the accelerator pedal opening is within the preset range, the processor 150 determines whether the brake is activated in S550. The processor 150 determines whether the driver presses the brake pedal through the brake pedal position sensor.

In S560, the processor 150 releases the safe mode when the brake is operating.

In S570, after the safe mode is released, the processor 150 initializes the safe parking flag. The processor 150 sets the safe parking flag to "0" because the vehicle is in the departure situation.

Then, in S580, the processor 150 outputs a safe mode release and sensitivity confirmation pop-up. The processor 150 may output a notification informing that the safe mode is released and the current sensitivity setting information in the form of a pop-up to the display. In addition, when the safe mode is released within a preset time (e.g., 3 seconds) after entering the safe mode, the processor 150 may determine it as an accelerator pedal mis-operation detection error and output a message requesting to change the set sensitivity.

Figure 5:
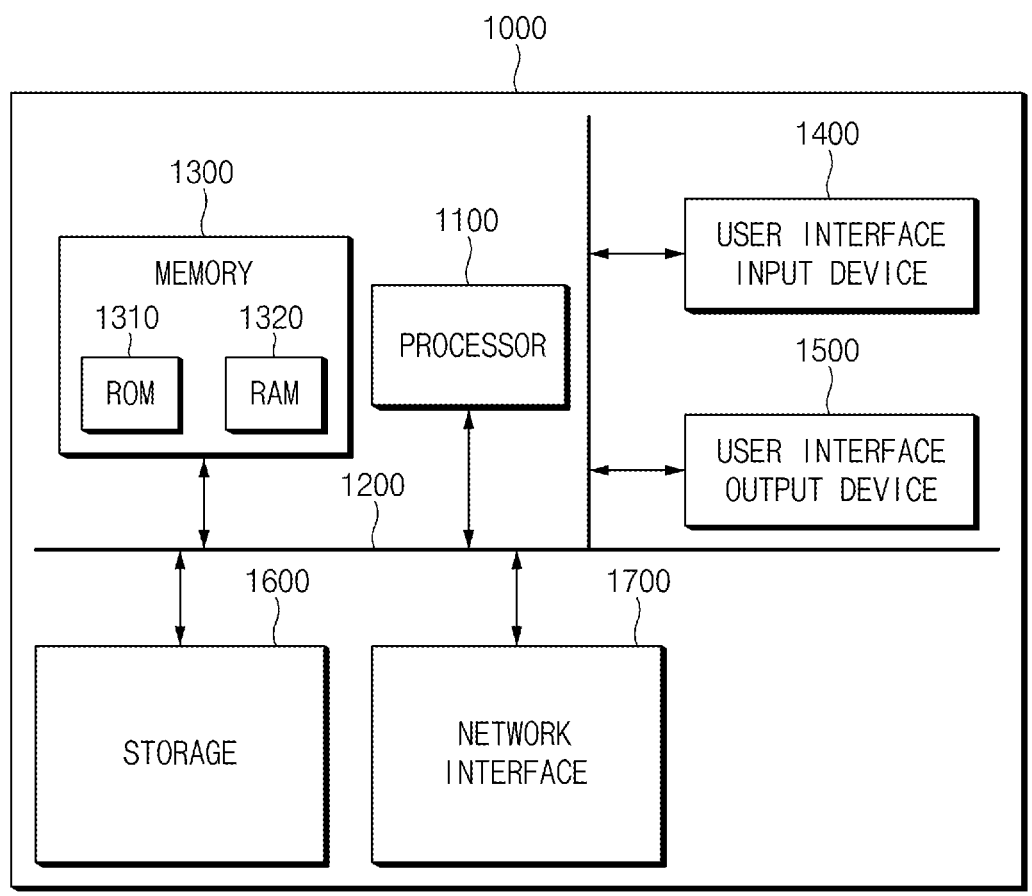
FIG. 5 is a block diagram illustrating a computing system for executing a method of processing an acceleration pedal mis-operation according to an embodiment of the present disclosure.

FIG. 5 is a block diagram illustrating a computing system for executing a method of processing an acceleration pedal mis-operation according to an embodiment of the present disclosure.

Referring to FIG. 5, a computing system 1000 may include at least one processor 1100, a memory 1300, a user interface input device 1400, a user interface output device 1500, storage 1600, and a network interface 1700 connected through a system bus 1200.

The processor 1100 may be a central processor (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to the present disclosure, the operation pattern of a driver is analyzed to detect the accelerator pedal mis-operation of the driver and action is taken on the detected accelerator pedal mis-operation of the driver, so that it is possible to prevent an accident from occurring due to the accelerator pedal mis-operation of a driver.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for processing an accelerator pedal mis-operation of a driver, the apparatus comprising:
   a vehicle information obtaining device configured to obtain vehicle information corresponding to an operation of the driver; and
   a processor configured to:
   detect an accelerator pedal monitoring situation based on the vehicle information;
   determine the accelerator pedal mis-operation of the driver based on an opening degree of an accelerator pedal corresponding to the operation of the driver in the accelerator pedal monitoring situation to enter a vehicle mode to be a safe mode, determine that an accelerator pedal mis-operation detection is error when the safe mode is released within a preset time after entering the safe mode; and in response to a determination that the accelerator pedal mis-operation detection is error, set a sensitivity of an accelerator pedal mis-operation detection by changing at least one reference value of the steering wheel operation angle, the accelerator pedal opening, or monitoring time.

2. The apparatus of claim 1, wherein the vehicle information obtaining device is configured to obtain at least one of a vehicle speed, a brake pedal position, a steering wheel operation angle, gear information, a direction indicator state, obstacle detection, an accelerator pedal opening, or a vehicle state through sensors installed in a vehicle.

3. The apparatus of claim 2, wherein the processor is configured to detect a parking situation or a departure situation as the accelerator pedal monitoring situation.

4. The apparatus of claim 1, wherein the processor is configured to determine the accelerator pedal mis-operation of the driver when the accelerator pedal opening is out of a preset range in the accelerator pedal monitoring situation.

5. The apparatus of claim 1, wherein, when a vehicle is an eco-friendly vehicle, the processor is configured to stop a motor or to shift gear information to a neutral (N) stage when entering the safe mode.

6. The apparatus of claim 1, wherein, when a vehicle is an engine vehicle, the processor is configured to ignore an accelerator pedal input corresponding to the operation of the driver when entering to the safe mode.

7. The apparatus of claim 1, wherein the processor is configured to output a safe mode entry notification and an accelerator pedal mis-operation warning through at least one of a cluster or a speaker when entering the safe mode.

8. The apparatus of claim 1, wherein the processor is configured to release the safe mode and allow acceleration control of a vehicle by an accelerator pedal operation of the driver when an accelerator pedal re-operation of the driver is detected in the safe mode.

9. The apparatus of claim 1, wherein the processor is configured to analyze a driving pattern of the driver and set the sensitivity of the accelerator pedal mis-operation detection based on the analyzed driving pattern.

10. A method of processing an accelerator pedal mis-operation of a driver, the method comprising:

obtaining vehicle information corresponding to an operation of the driver;

detecting an accelerator pedal monitoring situation based on the vehicle information;

determining an accelerator pedal mis-operation of the driver based on an opening degree of an accelerator pedal corresponding to the operation of the driver in the accelerator pedal monitoring situation;

in response to a determination of the accelerator pedal mis-operation of the driver, switching a vehicle mode to enter a safe mode;

determining that an accelerator pedal mis-operation detection is error when the safe mode is released within a preset time after entering the safe mode; and in response to a determination that the accelerator pedal mis-operation detection is error, setting a sensitivity of an accelerator pedal mis-operation detection by changing at least one reference value of the steering wheel operation angle, the accelerator pedal opening, or monitoring time.

11. The method of claim 10, wherein the vehicle information includes at least one of a vehicle speed, a brake pedal position, a steering wheel operation angle, gear information, a direction indicator state, obstacle detection, an accelerator pedal opening, or a vehicle state through sensors installed in a vehicle.

12. The method of claim 10, wherein the detecting an accelerator pedal monitoring situation includes detecting a parking situation or a departure situation as the accelerator pedal monitoring situation.

13. The method of claim 10, wherein the determining an accelerator pedal mis-operation of the driver includes determining the accelerator pedal mis-operation of the driver when the accelerator pedal opening is out of a preset range in the accelerator pedal monitoring situation.

14. The method of claim 10, wherein the switching a vehicle mode to enter the safe mode includes when a vehicle is an eco-friendly vehicle, stopping a motor or shifting gear information to a neutral (N) stage when switching to the safe mode.

15. The method of claim 10, wherein the switching a vehicle mode to enter the safe mode includes when a vehicle is an engine vehicle, ignoring an accelerator pedal input corresponding to the operation of the driver when entering the safe mode.

16. The method of claim 10, wherein the switching a vehicle mode to the safe mode includes when entering the safe mode, outputting a safe mode entry notification and an accelerator pedal mis-operation warning through at least one of a cluster or a speaker.

17. The method of claim 10, further comprising when an accelerator pedal re-operation of the driver is detected in the safe mode, releasing the safe mode to allow acceleration control of the vehicle by an accelerator pedal operation of the driver.

* * * * *